April 5, 1966 R. A. ANDERSEN ET AL 3,245,004

VARIABLE FREQUENCY SIGNAL GENERATOR WITH FEEDBACK LINEAR CONTROL CIRCUIT

Filed Jan. 3, 1964 2 Sheets-Sheet 1

INVENTORS
ROBERT A. ANDERSEN
JACK G.S. LUM

BY A. C. Smith
AGENT

April 5, 1966 R. A. ANDERSEN ET AL 3,245,004

VARIABLE FREQUENCY SIGNAL GENERATOR WITH FEEDBACK LINEAR CONTROL CIRCUIT

Filed Jan. 3, 1964 2 Sheets-Sheet 2

INVENTORS
ROBERT A. ANDERSEN
JACK G.S. LUM

BY A. C. Smith
AGENT 3,245,004

VARIABLE FREQUENCY SIGNAL GENERATOR WITH FEEDBACK LINEAR CONTROL CIRCUIT

Robert A. Andersen and Jack G. S. Lum, both of Palo Alto, Calif., assignors to Hewlett-Packard Company, Palo Alto, Calif., a corporation of California Filed Jan. 3, 1964, Ser. No. 335,475
10 Claims. (Cl. 332—9)

This invention relates to variable repetition rate signal generators and more particularly to circuit arrangements for generating a pulse train having a repetition rate which is a controllable function of the amplitude of an analog signal.

In many applications it is desirable to convert an analog signal into a pulse train having a repetition rate which is indicative of the analog signal. It is usually desirable in these applications that the repetition rate be a perfectly linear function of the analog signal. However, in certain cases it is also desirable that the repetition rate be a controllable nonlinear function of the analog signal. For example, in the measurement of temperature a thermocouple is frequently used with an output device such as a voltage-to-pulse rate converter and a counter. The output voltage of a thermocouple is a nonlinear function of temperature. It is often desirable to compensate for the nonlinearity of this function in the output device. This might be accomplished in the voltage-to-pulse rate converter by selecting a function of voltage-to-pulse rate conversion which is nonlinear in the opposite sense.

Certain voltage-to-pulse rate converters (also known as voltage-to-frequency converters) taught in the prior art employ a pulse forming circuit which generates feedback pulses having a repetition rate that is indicative of an analog input signal. (See U.S. Patents 3,022,469 and 3,040,273.) The characteristics of these pulse forming circuits are such that they provide linear conversion of an analog input signal into a pulse train output signal having only a limited range of repetition rates. Additionally, these pulse forming circuits may give rise to damped oscillations which may have an adverse effect on the linearity of analog signal-to-pulse rate conversion.

Accordingly, it is the principal object of this invention to provide a circuit arrangement for generating a pulse train having a pulse repetition rate which is a controllable function of the amplitude of an analog signal.

It is another object of this invention to provide an improved circuit arrangement for more linearly converting an analog signal to a pulse train having an increased range of repetition rates.

It is still another object of this invention to provide an improved circuit arrangement wherein the adverse effects of damped oscillations are substantially eliminated.

In accordance with the illustrated embodiment of this invention an integrator is connected to receive an analog signal, and a feedback pulse of opposite polarity generated by a pulse generator each time the output of the integrator reaches a predetermined level. The feedback pulse returns the output of the integrator to an initial level by reducing the charge on the integrating capacitor by a fixed decrement. The repetition rate of the feedback pulses is a function of the magnitude of the analog signal applied to the input of the integrator. The linearity of this function is dependent upon the generation of feedback pulses having a constant area. A control circuit is connected to the pulse generator to regulate the area of the feedback pulses generated thereby. The conversion factor or function relating the feedback pulse repetition rate to the magnitude of the analog signal applied to the integrator is controlled by regulating the area of the feedback pulses generated by the pulse generator. Further, the control circuit may include a ringing generator to compensate for any damped oscillations generated by the pulse generator. Output terminals are connected to the pulse generator to receive a pulse train having a repetition rate which corresponds to that of the feedback pulses.

Other and incidental objects of this invention will be apparent from a reading of this specification and an inspection of the accompanying drawing in which.

Figure 1:
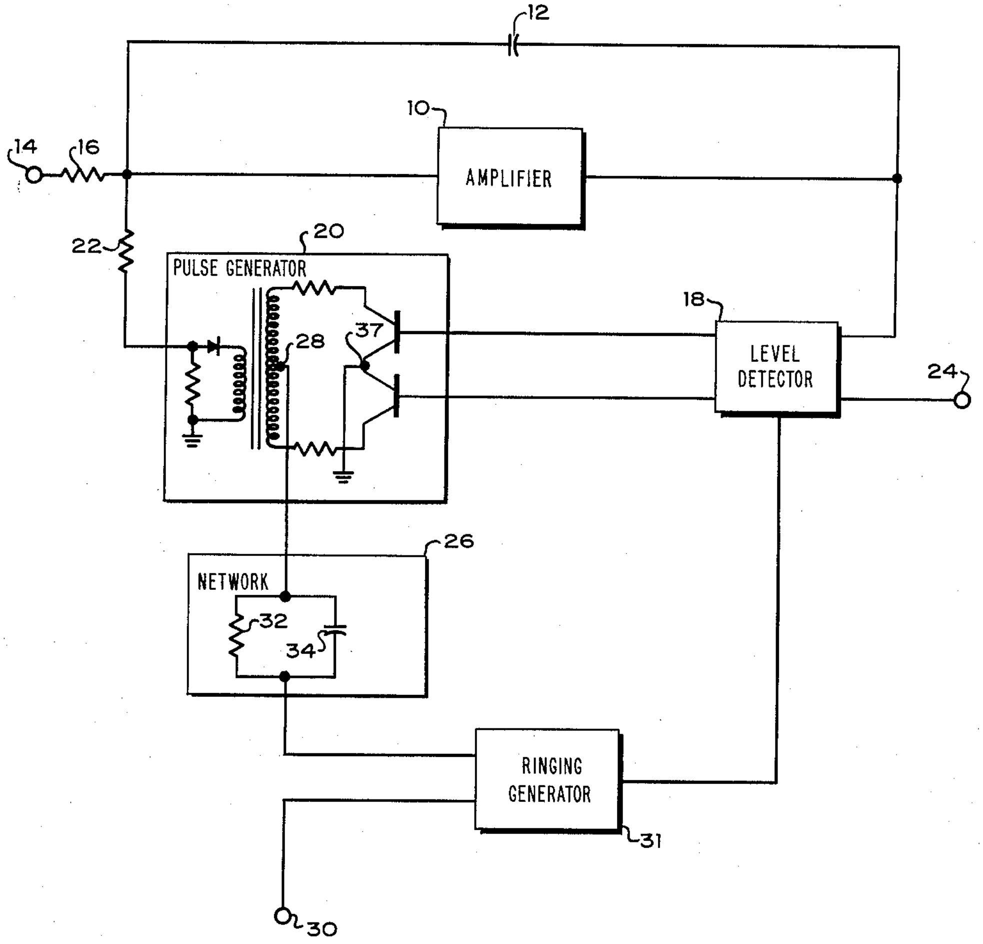
FIGURE 1 is a block diagram of a preferred embodiment of this invention.

Referring to FIGURE 1, there is shown an amplifier 10 shunted by a capacitor 12 to form a current integrator having an output voltage proportional to the integral of input current. An analog signal at terminal 14 is applied to the input of the integrator through serially-connected resistor 16. Each time the integrator output reaches a predetermined value of either polarity level detector 18 connected thereto triggers pulse generator 20 which generates a pulse of opposite polarity from that of the analog signal at terminal 14. This pulse is applied through resistor 22 to the input of the integrator to discharge the capacitor 12 by a fixed decrement. Pulse generator 20 may be of the saturable transformer type shown in simplified schematic form for a single polarity. The repetition rate at which the pulse generator 20 is triggered provides an indication of the analog input signal at terminal 24. In connection with this invention pulse repetition rate is defined as the average number of pulses per unit of time.

A control circuit including network 26 is connected to the pulse generator 20, for example, in the series circuit connecting the centertap 28 to the power supply 30, for controlling the voltage supplied to the pulse generator 20. This control circuit might alternatively be connected in other ways to control the voltage supplied to the pulse generator 20 such as in the series circuit connecting the terminal 37 to ground. Network 26 may include a combination of active or passive elements or, for example, it may be a resistor 32 and a reactive element such as a capacitor 34 or an inductor connected in parallel as shown. The control circuit may also include a ringing generator 31 having its input connected to level detector 18 and its output connected in the series circuit intermediate network 26 and power supply 30.

In operation an analog signal is applied to terminal 14 providing current through resistor 16 which charges capacitor 12 at a rate dependent upon the amount of current and the capacitance. The output voltage of the integrator is fed to the input of level detector 18. When this voltage reaches a predetermined value, level detector 18 triggers pulse generator 20. Each trigger pulse generated by level detector 18 is of sufficient magnitude to drive the saturable transformer well into saturation. Such switching of the saturable transformer between the saturation limits of the core causes the transformer to generate a pulse. As is well known under these conditions each pulse generated by the transformer will have a substantially constant area. The constant area pulse is fed back to the input of the amplifier 10 through the resistor 22 where it discharges the capacitor 12 by a fixed decrement. The capacitor 12 again charges and another cycle of operation is initiated. In this manner a pulse train is generated at output terminal 24 having a repetition rate which is dependent upon the amplitude of the analog input signal.

The linearity of the analog signal-to-pulse rate conversion is dependent upon the generation of constant area feedback pulses so that each feedback pulse will discharge the capacitor 12 by the same decrement. The feedback pulse area is partially dependent upon the voltage supplied to the pulse generator 20 by the power supply 30. By the appropriate use of feedback it is possible to control the voltage supplied to the pulse generator 20 and thereby the feedback pulse area as a function of either the output frequency or the input signal. Thus, the degree of linearity or nonlinearity of analog signal-to-pulse rate conversion may be selected as a function of either output pulse rate or analog input signal.

The network 26 is serially connected to the power supply 30 and provides a voltage which is a function of the repetition rate of the output signal. Feedback of the output signal to the network 26 is inherent in that drive current from power supply 30 to the centertap 28 is reduced during the time the transformer is being switched and is not in saturation. For example, where network 26 comprises a resistor 32 and capacitor 34 connected in parallel, the capacitor 34 will not have time to fully charge between pulses at high repetition rates. Thus, the voltage provided by network 26 is effectively reduced at higher repetition rates. The voltage provided by network 26 adds to the voltage supplied by the power supply 30 to the pulse generator 20. The area of the feedback pulses may therefore be controlled by simple adjustment of resistor 32 to alter the voltage provided by network 26. Such control of the feedback pulse area permits generation of a pulse train having a repetition rate which is a selected function of the amplitude of the analog input signal.

Typically the voltage-pulse rate characteristic of the core is linear for only a limited range of pulse rates. The voltage provided by network 26 may be adjusted to compensate for nonlinearity thereby providing a linear voltage-to-pulse rate conversion for a greater range of pulse rates than was generally possible with prior art devices. For example, this invention narrows the normal deviation from linearity measured in pulses per second deviation at pulse rates from zero to three hundred thousand pulses per second by at least two thirds. In addition, this invention provides a narrowed deviation from linearity for an increased range from zero to four hundred thousand pulses per second.

Pulse generators such as the one shown may generate damped oscillations, which may in turn have an effect on the linearity of analog signal-to-pulse rate conversion. Ringing generator 31 is adjusted to generate oscillations which have substantially the same magnitude effect on pulse area, though opposite in phase with respect to the damped oscillations arising in the pulse generator 20. Since the output of the ringing generator 31 is serially connected intermediate network 26 and power supply 30 the oscillations of the ringing generator 31 will cancel the damped oscillations of the pulse generator 20. The ringing generator 31 and the pulse generator 20 are triggered simultaneously since the input of each is connected to the output of level detector 18. This has the effect of increasing the maximum linearity of analog signal-to-pulse rate conversion provided by the circuit of this invention.

Figure 2:
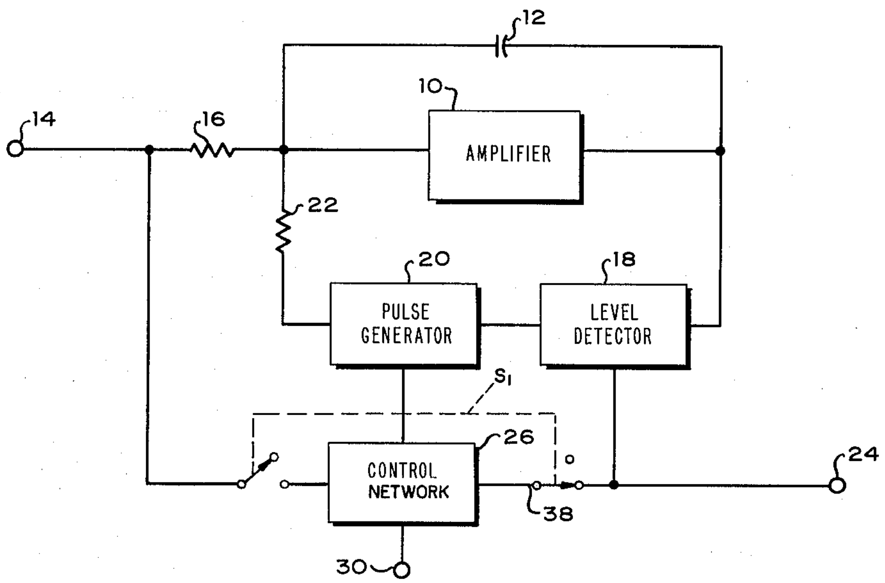
FIGURE 2 is a block diagram of another embodiment of this invention.

Referring to FIGURE 2, there is shown another embodiment of this invention wherein with the switch $S_1$ in the position shown the control circuit comprises a control network 26 and a feedback loop 38 which connects the output terminal 24 to the control network 26. By means of feedback loop 38 the voltage or current supplied to the pulse generator 20 is controlled as a function of the output signal. The effect is to make the linearity of analog signal-to-pulse rate conversion a controllable function of the output signal pulse rate. By actuating the switch $S_1$ to the alternate position the control circuit is altered in that the control network 26 is disconnected from the output terminal 24 and is connected to the input terminal 14 to make the linearity of analog signal-to-pulse rate conversion a function of the analog input.

Figure 3:
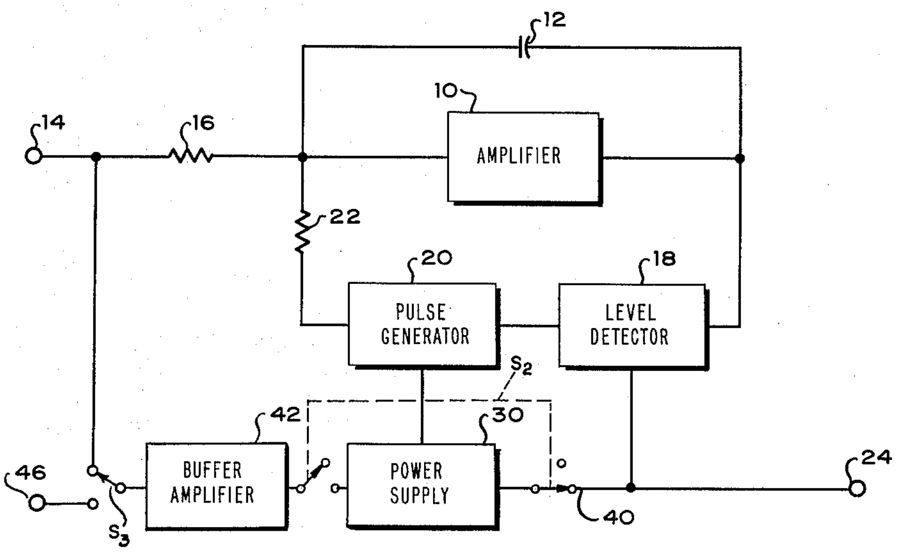
FIGURE 3 is a modification of the block diagram of FIGURE 2.

Referring now to FIGURE 3, a modification of the block diagram of FIGURE 2 is shown wherein within the switch $S_2$ in the position shown the control circuit comprises feedback loop 40 connecting output terminal 24 and power supply 30. By means of feedback loop 40 the voltage or current supplied by the power supply 30 to the pulse generator 20 is controlled as a function of the output signal. By actuating the switch $S_2$ to the alternate position the control circuit may include a buffer amplifier 42 connected intermediate a source of control signal and power supply 30. The source of control signal might comprise the analog signal at input terminal 14 with the switch $S_3$ in the position shown or some other signal generated at terminal 46 with the switch $S_3$ in the alternate position. The conversion factor of analog signal-to-pulse rate conversion is controlled as a function of the signal applied to power supply 30.

The above embodiments of this invention relate specifically to analog signal-to-pulse rate converters wherein a feedback pulse is generated at the time the integrator output reaches a predetermined value. Such a device has an output pulse train which tends to be periodic. However, this invention is not limited to devices having a periodic output pulse train. For example, it is also applicable to a system wherein the feedback pulses are generated only in coincidence with clock pulses. (See U.S. Patent 2,885,662.) This latter system generates a feedback pulse if at the time a clock pulse is generated the integrator output is either equal to or greater than a predetermined value. Thus for purposes of this invention the expression "attaining a predetermined value" as used in the claims appended hereto is defined as meaning either becoming equal to or exceeding a predetermined value.

We claim:

1. Signal apparatus comprising:
an integrator having an input and an output,
means to apply a signal to the input of said integrator,
circuit means connected to the output of said integrator for producing a pulse in response to the signal at said output attaining a predetermined value,
means connecting the output of said circuit means and the input of said integrator to reduce the signal at the output of said integrator by fixed decrements,
means including a control circuit connected to said circuit means for controlling the area of the pulse generated by said circuit means, and
output means connected to said circuit means.

2. Signal apparatus as in claim 1 wherein said control circuit includes signal producing means responsive to the signal at the output of said integrator attaining said predetermined value for applying a compensating signal to said circuit means.

3. Signal apparatus as in claim 1 wherein said circuit means include a saturable transformer circuit.

4. Signal apparatus comprising:
an integrator having an input and an output,
means to apply a signal to the input of said integrator,
pulse forming means connected to the output of said integrator for generating a pulse in response to the signal at said output attaining a predetermined value,
means connecting the output of said pulse forming means and the input of said integrator to reduce the signal at the output of said integrator by fixed decrements,
a source of bias potential for said pulse forming means,
a control circuit including a network which is serially connected intermediate said pulse forming means and said source of bias potential for controlling the area of the pulse generated by said pulse forming means, said control circuit being connected to receive a control signal, and
output means connected to said pulse forming means.

5. Signal apparatus comprising:
a signal input and a signal output,
an integrator having an input and an output,
means connecting said signal input to the input of said integrator for applying a signal to the input of said integrator,
pulse forming means connected to the output of said integrator for generating a pulse in response to the signal at said output attaining a predetermined value,
means connecting the output of said pulse forming means and the input of said integrator to reduce the signal at the output of said integrator by fixed decrements,
a source of bias potential for said pulse forming means,
a control network having an input and an output,
means connecting the output of said control network intermediate said pulse forming means and said source of bias potential for controlling the area of the pulse generated by said pulse forming means,
a signal path connecting the input of said control network and one of said signal input and said signal output, and
means connecting said signal output to said pulse forming means.

6. Signal apparatus comprising:
an integrator having an input and an output,
means to apply a signal to the input of said integrator,
pulse forming means connected to the output of said integrator for generating a pulse in response to the signal at said output attaining a predetermined value,
a source of bias potential for said pulse forming means,
means connecting the output of said pulse forming means and the input of said integrator to reduce the signal at the output of said integrator by fixed decrements,
output means connected to said pulse forming means to receive an output signal, and
a control circuit including a network connected intermediate said pulse forming means and said source of bias potential for controlling the area of the pulse generated by said pulse forming means, said network including circuit elements to regulate the bias potential supplied to said pulse forming means as a function of the repetition rate of the pulses generated by said pulse forming means, 7. Signal apparatus as in claim 6 wherein said network includes the parallel combination of a resistor and a reactive element.

8. Signal apparatus as in claim 7 wherein said pulse forming means includes a saturable transformer circuit.

9. Signal apparatus as in claim 8 wherein said control circuit includes signal producing means having an input and an output,
means connecting the input of said signal producing means to said pulse forming means to synchronize the triggering of said signal producing means with the triggering of said pulse forming means, and
means connecting the output of said signal producing means to said network intermediate said source of bias potential and said pulse forming means.

10. Signal apparatus comprising:
a signal input and a signal output,
an integrator having an input and an output,
means connecting said signal input to the input of said integrator for applying a voltage signal to the input of said integrator,
pulse forming means connected to the output of said integrator for generating a pulse in response to the signal at said output attaining a predetermined value,
means connecting the output of said pulse forming means and the input of said integrator to reduce the signal at the output of said integrator by fixed decrements,
a source of bias potential connected to said pulse forming means,
a control circuit being connected to receive a control signal and to apply the control signal to said source of bias potential for controlling the area of the pulse generated by said pulse forming means, and
output means connected to said pulse forming means.

References Cited by the Examiner

UNITED STATES PATENTS

| | | | |
|---|---|---|---|
| 3,022,469 | 2/1962 | Bahrs et al. | 332—14 |
| 3,040,273 | 6/1962 | Boff | 332—14 |
| 3,064,208 | 11/1962 | Bullock et al. | 332—9 |

ROY LAKE, *Primary Examiner.*

ALFRED L. BRODY, *Examiner.*